(12) United States Patent
LeMay

(10) Patent No.: US 12,093,182 B2
(45) Date of Patent: Sep. 17, 2024

(54) TYPED STORE BUFFERS FOR HARDENING STORE FORWARDING

(71) Applicant: Intel Corporation, Santa Clara, CA (US)

(72) Inventor: Michael LeMay, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 45 days.

(21) Appl. No.: 17/561,817

(22) Filed: Dec. 24, 2021

(65) Prior Publication Data

US 2022/0114104 A1 Apr. 14, 2022

(51) Int. Cl.
| | |
|---|---|
| *G06F 12/0875* | (2016.01) |
| *G06F 9/30* | (2018.01) |
| *G06F 9/38* | (2018.01) |
| *G06F 9/54* | (2006.01) |
| *G06F 12/1027* | (2016.01) |

(52) U.S. Cl.
CPC ...... *G06F 12/0875* (2013.01); *G06F 9/30098* (2013.01); *G06F 9/3826* (2013.01); *G06F 9/3836* (2013.01); *G06F 9/544* (2013.01); *G06F 12/1027* (2013.01)

(58) Field of Classification Search
CPC ............. G06F 12/0875; G06F 9/30098; G06F 9/3836; G06F 9/544; G06F 12/1027; G06F 9/30043; G06F 21/79; G06F 2212/1052; G06F 9/35; G06F 9/3826; G06F 9/4881; G06F 12/1441; G06F 12/1466; G06F 9/3834; G06F 9/3842; G06F 9/3828

See application file for complete search history.

(56) References Cited

U.S. PATENT DOCUMENTS

| | | | | |
|---|---|---|---|---|
| 7,600,097 B1* | 10/2009 | Wright | ................ | G06F 9/30167 |
| | | | | 712/216 |
| 2021/0157590 A1* | 5/2021 | King | ..................... | G06F 9/3836 |
| 2022/0027459 A1* | 1/2022 | Favor | .................... | G06F 9/3859 |

* cited by examiner

*Primary Examiner* — Charles Rones
*Assistant Examiner* — Hewy H Li
(74) *Attorney, Agent, or Firm* — Nicholson De Vos Webster & Elliott LLP

(57) ABSTRACT

A method comprises receiving, in a store buffer, at least a portion of a store instruction, the at least a portion of the store instruction comprising a data operand and a first object capability register operand which comprises a first object type identifier for a first object, obtaining, from a corresponding load instruction, a second object capability register operand which comprises a second object type identifier, and determining whether the first object type identifier matches the second object type identifier.

17 Claims, 9 Drawing Sheets

FIG. 2A
FIG. 2B

TYPED STORE BUFFERS FOR HARDENING STORE FORWARDING

BACKGROUND

Subject matter described herein relates generally to the field of computer security and more particularly to typed store buffers for hardening store forwarding.

A processor, or set of processors, executes instructions from an instruction set, e.g., the instruction set architecture (ISA). The instruction set is the part of the computer architecture related to programming, and generally includes the native data types, instructions, register architecture, addressing modes, memory architecture, interrupt and exception handling, and external input and output (I/O). It should be noted that the term instruction herein may refer to a macro-instruction, e.g., an instruction that is provided to the processor for execution, or to a micro-instruction, e.g., an instruction that results from a processor's decoder decoding macro-instructions.

BRIEF DESCRIPTION OF THE DRAWINGS

The detailed description is described with reference to the accompanying figures.

FIG. 2A is a schematic illustration of a pointer in an implementation of typed store buffers for hardening store forwarding in accordance with some examples.

FIG. 2B is a schematic illustration of a pointer in an implementation of typed store buffers for hardening store forwarding in accordance with some examples.

DETAILED DESCRIPTION

Figure 1:
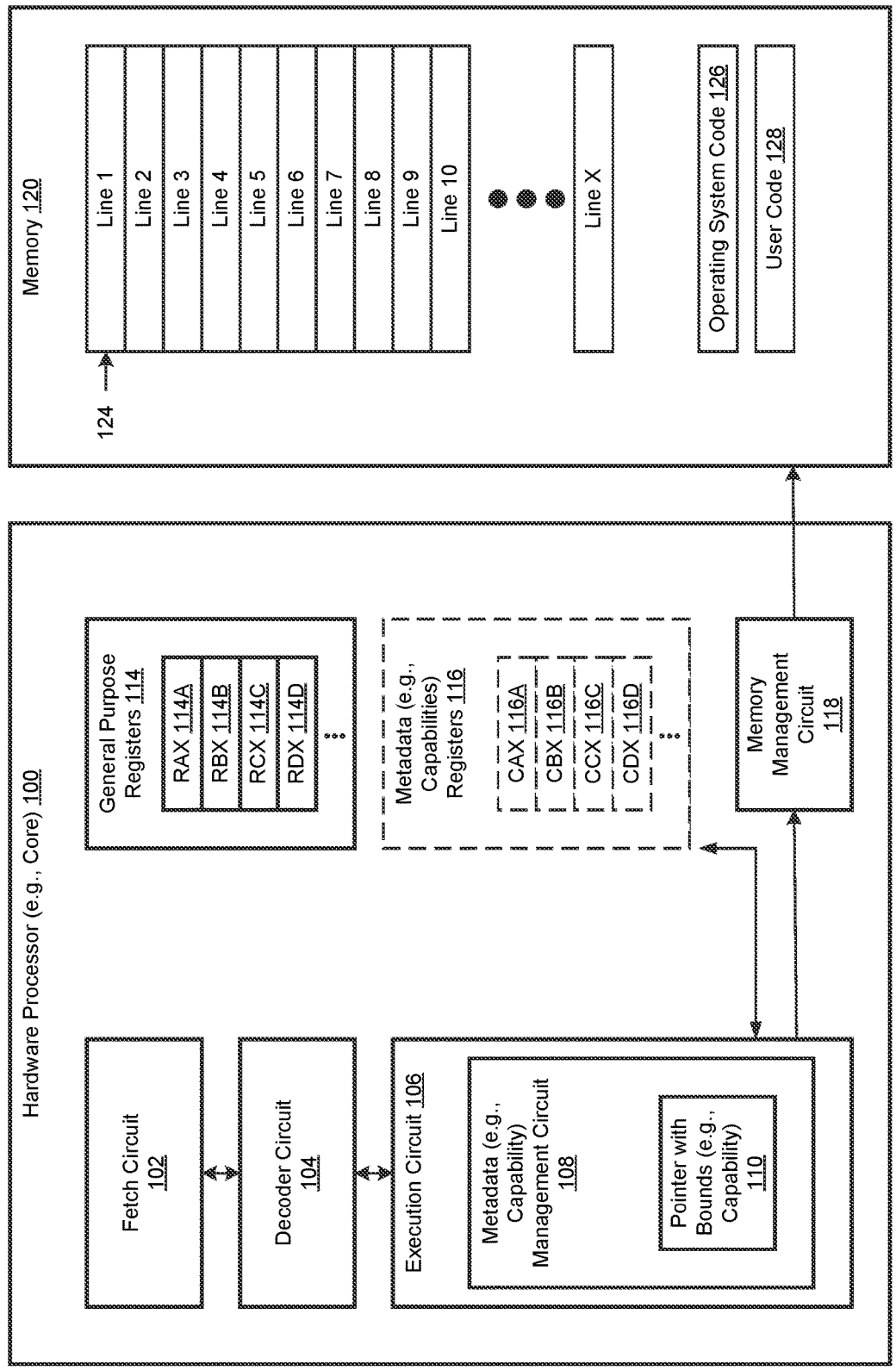
FIG. 1 is a schematic, block diagram illustration of a multiple core hardware processor in an implementation of typed store buffers for hardening store forwarding in accordance with some examples.

Described herein are exemplary systems and methods to implement typed store buffers for hardening store forwarding. In the following description, numerous specific details are set forth to provide a thorough understanding of various examples. However, it will be understood by those skilled in the art that the various examples may be practiced without the specific details. In other instances, well-known methods, procedures, components, and circuits have not been illustrated or described in detail so as not to obscure the examples.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A (e.g., hardware) processor (e.g., having one or more cores) may execute instructions (e.g., a thread of instructions) to operate on data, for example, to perform arithmetic, logic, or other functions. For example, software may request an operation and a hardware processor (e.g., a core or cores thereof) may perform the operation in response to the request. Thus, there is a need to support memory safety and scalable compartmentalization in hardware. Finer-grained compartmentalization of software can also be used to harden against side channel attacks.

In some instances, store-to-load forwarding can transiently reveal sensitive information from a store in one portion of a program through a load in a different portion of the program that may then be disclosed to an adversary via a side channel transmitter instruction, e.g., by controlling which cache line gets loaded. This may occur even if another store between the sensitive store and the load attempts to clear the sensitive information. It may also be possible for an adversary to corrupt a subsequent load to maliciously influence the program execution. For example, an adversary may have control over an instruction that writes an integer value that is then forwarded to a pointer load, which can lead to an unauthorized pointer access. This is one example that illustrates how checking type information during store-to-load forwarding can be useful for hardening the program's transient execution, since the pointer and integer would have different types To address these and other issues, described herein are systems and methods to implement typed store buffers for hardening store forwarding. In some examples described herein, when a store is performed specifying a capability (e.g., as a base address register), type information contained within the specified capability can be associated with the store buffer entry created for that store. Subsequently, when processing circuitry attempts to forward the stored data to a load, the processing circuitry can check that the load expects to receive the same type of data that was stored into that store buffer. The processor can determine the expected type from the capability used for the load. In some examples, the type information in capabilities may be stored as a numeric type ID. Further structural and methodological details are relating to implementing typed store buffers for hardening store forwarding are described below with reference to FIG. 1 through FIG. 7, below.

FIG. 1 is a schematic, block diagram illustration of a multiple core hardware processor in an implementation of typed store buffers for hardening store forwarding in accordance with some examples. Referring to FIG. 1, hardware processor 100 (e.g., core) including a metadata (e.g., capability) management circuit 108 and coupled to a memory 120 according to examples of the disclosure. Although the metadata (e.g., capability) management circuit 108 is depicted within the execution circuit 106, it should be understood that the metadata (e.g., capability) management circuit can be located elsewhere, for example, in another component of hardware processor 100 (e.g., within fetch circuit 102) or separate from the depicted components of hardware processor 100.

In certain examples, metadata (e.g., capability) management circuit 108 enforces one or more (e.g., many) requirements for accessing (e.g., storing) security metadata or other metadata alongside each allocation (e.g., object) in memory. For example, metadata may include one or more (e.g., any single or combination of): (i) a tag (or version) number (e.g., used to prevent dangling pointers from accessing memory in a use-after free (UAF) attack), (ii) a bitmap that indicates which portions of an object contain pointers that are to be protected from corruption, (iii) a per-object key or key ID that is assigned to uniquely encrypt and/or decrypt each object, (iv) a type identification (ID) that is associated with each object of that specified type, (v) an ownership ID used to enforce (e.g., according to a Rust specification) ownership transfer and borrowing, (vi) a table specifying the category of each pointer and data item associated with each portion of an object that may contain a distinct pointer or data item, (vii) an identifier for code authorized to access the data such as a code hash value, or (viii) an aggregate cryptographic message authentication code (MAC) value, Integrity-Check Value (ICV), or error correction code (ECC) for the data allocation.

Certain examples utilize a memory corruption detection (MCD) value in each pointer and a corresponding (e.g., matching) MCD value saved in the memory for the memory being pointed to, for example, saved as (e.g., tag) metadata (e.g., data that describes other data) for each block of data being pointed to by the pointer. A MCD value may be a sequence of bits, for example, 2, 3, 4, 5, 6, 7, 8. 9, 10, 11, 12, 13, 14, 15, 16 bits, etc. In certain examples, metadata (e.g., capability) management circuit 108 validates pointers produced by instructions of the applications being executed by the processing system or processor that request access to the memory. Certain examples herein (e.g., of settings of metadata (e.g., capability) management circuit 108) utilize one of more of the following attributes for memory corruption detection: MCD enabled (e.g., to turn the MCD feature on or off), MCD position (e.g., to define the bit position(s) of MCD values (metadata) in pointers), MCD protected space, for example, a prefix in the most significant bit positions of the pointer (e.g., to define the linear address range that is to be protected by the architecture), and MCD directory base (e.g., to point to the memory MCD value (e.g., metadata) table (e.g., directory)).

Certain examples use an ownership ID to enforce (e.g., according to a Rust specification) ownership transfer and borrowing, e.g., with the ownership ID being metadata for a pointer. In certain examples, memory 120 is managed through a system of ownership with a set of rules that the compiler checks at compile time, e.g., according to a Rust specification. In certain examples, the rules of ownership include one or more (e.g., all) of: (i) each value has a variable that is called its "owner", (ii) there can only be one owner at a time for a value, and (iii) when the owner goes out of scope, the value is dropped (e.g., freed from memory).

Depicted hardware processor 100 includes a hardware fetch circuit 102 to fetch an instruction (e.g., from memory 120), e.g., an instruction that is to request access to a block (or blocks) of memory 120 through a pointer with bounds 110 (e.g., a capability) to the block (or blocks) of the memory 120. Depicted hardware processor 100 includes a hardware decoder circuit 104 to decode an instruction, e.g., an instruction that is to request access to a block (or blocks) of memory 120 through a pointer with bounds 110 (e.g., a capability) to the block (or blocks) of the memory 120. Depicted hardware execution circuit 106 is to execute the decoded instruction, e.g., an instruction that is to request access to a block (or blocks) of memory 120 through a pointer with bounds 110 (e.g., a capability) to the block (or blocks) of the memory 120.

In certain examples, metadata (e.g., capability) management circuit 108 is to, in response to receiving an instruction that is requested for fetch, decode, and/or execution, check if the instruction is a bounds-checking instruction (e.g., an instruction that is to access memory via a pointer including a bounds field) or a non-bounds instruction (e.g., a bounds-unaware instruction), for example, and (i) if a bounds instruction, is to allow access to memory 120 storing data and/or instructions (e.g., an object) within the indicated bounds (e.g., but not outside of the bounds), and/or (ii) if a non-bounds instruction, is not to allow access to memory 120 storing data and/or instructions (e.g., an object) within any bounded storage (e.g., object storage). In some examples, this latter property is enforced by applying a default bounds check to the accesses by the non-bounds instruction. In some examples, bounded storage is partially or fully accessible by non-bounds instructions. In certain examples, a bounds instruction is a bounds-checking instruction, for example, and is not a BOUND instruction that checks an array index against bounds (e.g., that determines if the first operand (array index) is within the bounds of an array specified by the second operand (bounds operand)).

In certain examples, metadata (e.g., capability) management circuit 108 is to, in response to receiving an instruction that is requested for fetch, decode, and/or execution, check if the instruction is a capability instruction or a non-capability instruction (e.g., a capability-unaware instruction), for example, and (i) if a capability instruction (for example, an instruction authorized to manipulate capabilities, e.g., change the contents of the capabilities themselves), is to allow access to memory 120 storing (1) a capability and/or (2) data and/or instructions (e.g., an object) protected by a capability, and/or (ii) if a non-capability instruction, is not to allow access to memory 120 storing (1) a capability and/or (2) data and/or instructions (e.g., an object) protected by a capability.

In certain examples, metadata (e.g., capability) management circuit 108 is to check if an instruction is a bounds instruction or a non-bounds instruction by checking (i) a field (e.g., opcode) of the instruction (e.g., checking a corresponding bit or bits of the field that indicate if that instruction is a bounds instruction or a non-bounds instruction) and/or (ii) if a particular operand register is a "bounds" type of register (e.g., instead of a general-purpose data register) (e.g., implying that certain register(s) are not to be used to store a bounds field).

In certain examples, metadata (e.g., capability) management circuit 108 is to check if an instruction is a capability instruction or a non-capability instruction by checking (i) a field (e.g., opcode) of the instruction (e.g., checking a corresponding bit or bits of the field that indicate if that instruction is a capability instruction or a non-capability instruction) and/or (ii) if a particular operand register is a "capability" type of register (e.g., instead of a general-purpose data register) (e.g., implying that certain register(s) are not to be used to store a capability or capabilities). In certain examples, metadata (e.g., capability) management circuit 108 is to manage the capabilities, e.g., only the metadata (e.g., capability) management circuit is to set and/or clear validity tags. In certain examples, metadata (e.g., capability) management circuit 108 is to clear the validity tag of a capability in a register in response to that register being written to by a non-capability instruction. In certain examples, capabilities are encrypted so that they are protected from corruption and forgery without requiring a validity tag. In certain examples, capabilities are split across multiple registers.

In certain examples, the source storage location (e.g., virtual address) in memory 120 for data (e.g., an object) within the bounds of the "pointer with bounds" 110 is an operand of an (e.g., supervisor level or user level) instruction (e.g., having a mnemonic of LoadData) that is to load the data (e.g., an object) included within those bounds from the memory 120 into register(s) 112. In certain examples, the source storage location (e.g., virtual address) in memory 120 for instructions within the bounds of the "pointer with bounds" 110 is accessed by the fetch circuit 102 of the hardware processor 100 to fetch the instructions within the code region demarcated by those bounds from the memory 120. In certain examples, the destination storage location (e.g., virtual address) in memory 120 for data and/or instructions (e.g., an object) to-be-protected by the bounds of the "pointer with bounds" 110 is an operand of an (e.g., supervisor level or user level) instruction (e.g., having a mnemonic of StoreData) that is to store the data and/or instructions (e.g., an object) protected by those bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the bounds field, e.g., to set the lower bound and/or upper bound of an object.

In certain examples, the source storage location (e.g., virtual address) in memory 120 for data and/or instructions (e.g., an object) protected by the metadata and/or bounds of the "pointer with metadata and/or bounds" 110 (e.g., capability) is an operand of an (e.g., supervisor level or user level) instruction (e.g., having a mnemonic of LoadData) that is to load the data and/or instructions (e.g., an object) protected by the metadata and/or bounds from the memory 120 into register(s) 112. In certain examples, the destination storage location (e.g., virtual address) in memory 120 for data and/or instructions (e.g., an object) to-be-protected by the metadata and/or bounds of the "pointer with metadata and/or bounds" 110 is an operand of an (e.g., supervisor level or user level) instruction (e.g., having a mnemonic of StoreData) that is to store the data and/or instructions (e.g., an object) protected by the metadata and/or bounds from the register(s) 112 into memory 120. In certain examples, the instruction is requested for execution by executing OS code 126 (e.g., or some other privileged process authorized to do so) and/or by executing user code 128. In certain examples, an instruction set architecture (ISA) includes one or more instructions for manipulating the metadata and/or bounds field(s) (e.g., the fields in FIGS. 2A-4), e.g., to set the metadata and/or bound(s) of an object. In certain example, an instruction set architecture (ISA) includes one or more instructions for manipulating the capability field(s) (e.g., the fields in FIGS. 2A-4), e.g., to set the metadata and/or bound(s) of an object in memory.

In certain examples, metadata (e.g., capability) management circuit 108 is to enforce security properties on changes to metadata (e.g., capability data), for example, for the execution of a single capability instruction, by enforcing: (i) provenance validity that ensures that valid capabilities can only be constructed by instructions that do so explicitly (e.g., not by byte manipulation) from other valid capabilities (e.g., with this property applying to capabilities in registers and in memory), (ii) capability monotonicity that ensures, when any instruction constructs a new capability (e.g., except in sealed capability unsealing and invocation and exception raising), it cannot exceed the permissions and bounds of the capability from which it was derived, and/or (iii) reachable capability monotonicity that ensures, in any execution of arbitrary code, until execution is yielded to another domain, the set of reachable capabilities (e.g., those accessible to the current program state via registers, memory, sealing, unsealing, and/or constructing sub-capabilities) cannot increase.

In certain examples, metadata (e.g., capability) management circuit 108 (e.g., at boot time) provides initial capabilities to the firmware, allowing data access and instruction fetch across the full address space. Additionally, all tags are cleared in memory in certain examples. Further capabilities can then be derived (e.g., in accordance with the monotonicity property) as they are passed from firmware to boot loader, from boot loader to hypervisor, from hypervisor to the OS, and from the OS to the application. At each stage in the derivation chain, bounds and permissions may be restricted to further limit access. For example, the OS may assign capabilities for only a limited portion of the address space to the user software, preventing use of other portions of the address space. In certain examples, capabilities carry with them intentionality, e.g., when a process passes a capability as an argument to a system call, the OS kernel can use only that capability to ensure that it does not access other process memory that was not intended by the user process (e.g., even though the kernel may in fact have permission to access the entire address space through other capabilities it holds). In certain examples, this prevents "confused deputy"

problems, e.g., in which a more privileged party uses an excess of privilege when acting on behalf of a less privileged party, performing operations that were not intended to be authorized. In certain examples, this prevents the kernel from overflowing the bounds on a user space buffer when a pointer to the buffer is passed as a system-call argument. In certain examples, these architectural properties of a metadata (e.g., capability) management circuit 108 provide the foundation on which a capability-based OS, compiler, and runtime can implement a certain programming language (e.g., C and/or C++) language memory safety and compartmentalization.

In certain examples, the capability points to an object that is stored in multiple lines of data. For example, a block of memory may be lines 1 and 2 of data of the (e.g., physical) addressable memory 122 of memory 120 having an address 124 to one (e.g., the first) line (e.g., line 1). Certain examples have a memory of a total size X, where X is any positive integer.

In certain examples, the capability is stored in a single line of data (or less than a single line of data). In certain examples, the capability is stored in multiple lines of data. In certain examples, capabilities (e.g., one or more fields thereof) themselves are also stored in memory 120, for example, in a data structure (e.g., table) for capabilities. In certain examples, a (e.g., validity) tag is stored in data structure for a capability stored in memory. In certain examples, tags (e.g., in data structure) are not accessible by non-capability (e.g., load and/or store) instructions. In certain examples, a (e.g., validity) tag is stored along with the capability stored in memory (e.g., in one contiguous block).

Depicted hardware processor 100 includes one or more registers 112, for example, general purpose (e.g., data) register(s) 114 (e.g., registers RAX 114A, RBX 114B, RCX 114C, RDX 114D, etc.) and/or (optional) (e.g., dedicated for use with metadata (e.g., capabilities)) metadata (e.g., capabilities) register(s) 116 (e.g., registers CAX 116A, CBX 116B, CCX 116C, CDX 116D, etc.).

Hardware processor 100 includes a coupling (e.g., connection) to memory 120. In certain examples, memory 120 is a memory local to the hardware processor (e.g., system memory). In certain examples, memory 120 is a memory separate from the hardware processor, for example, memory of a server. Note that the figures herein may not depict all data communication connections. One of ordinary skill in the art will appreciate that this is to not obscure certain details in the figures. Note that a double headed arrow in the figures may not require two-way communication, for example, it may indicate one-way communication (e.g., to or from that component or device). Any or all combinations of communications paths may be utilized in certain examples herein.

In certain examples, an indication (e.g., name) of the destination register for data and/or instructions (e.g., an object) protected by the metadata and/or bounds of the "pointer with metadata and/or bounds" 110 in register(s) 112 is an operand of an (e.g., supervisor level or user level) instruction (e.g., having a mnemonic of LoadData) that is to load the data and/or instructions (e.g., an object) to-be-protected by the metadata and/or bounds of the "pointer with metadata and/or bounds" 110 from the memory 120 into register(s) 112. In certain examples, an indication (e.g., name) of the source register for data and/or instructions (e.g., an object) to-be-protected by the metadata and/or bounds of the "pointer with metadata and/or bounds" 110 in register(s) 112 is an operand of an (e.g., supervisor level or user level) instruction (e.g., having a mnemonic of StoreData) that is to store the data and/or instructions (e.g., an object) from the register(s) 112 into memory 120.

In certain examples, metadata (e.g., capability) management circuit 108 uses bounds-based access control for enforcing memory safety, e.g., and low-overhead compartmentalization. Examples herein are directed to metadata (e.g., capability) management circuit 108 for implementing non-redundant metadata storage in memory 120 addressed by a pointer 110 including a bounds field (e.g., a capability including a bounds field). Examples herein are directed to metadata (e.g., capability) management circuit 108 for implementing non-redundant metadata storage in memory 120 that is addressed by a pointer 110 including a bounds field and a metadata field (e.g., a capability including a bounds field and a metadata field), and thus do not waste memory or (e.g., unduly) limit the amount of metadata that can be associated with each object in memory. Examples herein are directed to metadata (e.g., capability) management circuit 108 for implementing non-redundant security metadata storage in memory 120 that is addressed by a pointer 110 including a bounds field and a security field (e.g., a capability including a bounds field and a security field (e.g., validity tag)), and thus provide enhanced security (e.g., via security metadata) and do not waste memory or limit the amount of metadata that can be associated with each object in memory.

The circuitry, methods, and a storage format for implementing non-redundant metadata storage in memory disclosed herein are improvements to the functioning of a processor (e.g., of a computer) itself, e.g., they are improvements to the functioning of a processor (e.g., of a computer) itself as they provide enhanced security (e.g., via security metadata) and do not waste memory or limit the amount of metadata that can be associated with each object in memory. Examples herein are improvements to the functioning of a processor (e.g., of a computer) itself as they allow more efficient utilization of memory.

A capability may have different formats and/or fields. In certain examples, a capability is more than twice the width of a native (e.g., integer) pointer type of the baseline architecture, for example, 128-bit or 129-bit capabilities on 64-bit platforms, and 64-bit or 65-bit capabilities on 32-bit platforms. In certain examples, each capability includes an (e.g., integer) address of the natural size for the architecture (e.g., 32 or 64 bit) and additional metadata, that is compressed in order to fit) in the remaining (e.g., 32 or 64) bits of the capability. In certain examples, each capability includes (or is associated with) a (e.g., 1-bit) validity "tag" whose value is maintained in registers and memory by the architecture (e.g., by metadata (e.g., capability) management circuit 108). In certain examples, each element of the capability contributes to the protection model and is enforced by hardware (e.g., metadata (e.g., capability) management circuit 108).

In certain examples, capability compression reduces the memory footprint of capabilities, e.g., such that the full capability, including address, permissions, and bounds fits within a certain width (e.g., 128 bits plus a 1-bit out-of-band tag). In certain examples, capability compression takes advantage of redundancy between the address and the bounds, which occurs where a pointer typically falls within (or close to) its associated allocation. In certain examples, the compression scheme uses a floating-point representation, allowing high-precision bounds for small objects, but uses stronger alignment and padding for larger allocations.

FIG. 2A is a schematic illustration of an example format of a pointer with bounds (e.g., a capability) including a validity tag 110A field, a bounds 110B field, and an address 110C (e.g., virtual address) field according to examples of the disclosure.

In certain examples, the format of a pointer with bounds (e.g., a capability) includes one or any combination of the following. A validity tag 110A where the tag tracks the validity of a capability, e.g., if invalid, the capability cannot be used for load, store, instruction fetch, or other operations. In certain examples, it is still possible to extract fields from an invalid capability, including its address. In certain examples, capability-aware instructions maintain the tag (e.g., if desired) as capabilities are loaded and stored, and as capability fields are accessed, manipulated, and used. A bounds 110B that identifies the lower bound and/or upper bound of the portion of the address space to which the capability authorizes access (e.g., loads, stores, instruction fetches, or other operations). An address 110C (e.g., virtual address) for the address of the capability protected data (e.g., object). Permissions 110D include a value (e.g., mask) that controls how the capability can be used, e.g., by restricting loading and storing of data and/or capabilities or by prohibiting instruction fetch. An object type 110E that identifies the object, for example (e.g., in a (e.g., C++) programming language that supports a "struct" as a composite data type (or record) declaration that defines a physically grouped list of variables under one name in a block of memory, allowing the different variables to be accessed via a single pointer or by the struct declared name which returns the same address), a first object type may be used for a struct of people's names and a second object type may be used for a struct of their physical mailing addresses (e.g., as used in an employee directory). In certain examples, if the object type 110E is not equal to a certain value (e.g., −1), the capability is "sealed" (with this object type) and cannot be modified or dereferenced. Sealed capabilities can be used to implement opaque pointer types, e.g., such that controlled non-monotonicity can be used to support fine-grained, in-address-space compartmentalization. In some examples, instructions accepting the capability as an operand specify allowable types that a particular sequence of code can operate upon, e.g., and the processor may generate an exception if the type encoded into metadata stored alongside the object does not match any of the specified allowable types. A version field 110F to store a version identifier (e.g., MCD value discussed herein).

In certain examples, permissions 110D include one or more of the following: "Load" to allow a load from memory protected by the capability, "Store" to allow a store to memory protected by the capability, "Execute" to allow execution of instructions protected by the capability, "LoadCap" to load a valid capability from memory into a register, "StoreCap" to store a valid capability from a register into memory, "Seal" to seal an unsealed capability, "Unseal" to unseal a sealed capability, "System" to access system registers and instructions, "BranchSealedPair" to use in an unsealing branch, "CompartmentID" to use as a compartment ID, "MutableLoad" to load a (e.g., capability) register with mutable permissions, and/or "User[N]" for software defined permissions (where N is any positive integer greater than zero).

In certain examples, the validity tag 110A provides integrity protection, the permission(s) 110D limits the operations that can be performed on the corresponding data (or instructions) protected by the capability, the bounds 110B limits how the value can be used (e.g., for example, for memory access), the object type 110E supports higher-level software encapsulation, and/or the address 110C is the memory address storing the corresponding data (or instructions) protected by the capability.

In certain examples, a capability (e.g., value) includes one or any combination of the following fields: address value (e.g., 64 bits), bounds (e.g., 87 bits), flags (e.g., 8 bits), object type (e.g., 15 bits), permissions (e.g., 16 bits), tag (e.g., 1 bit), global (e.g., 1 bit), and/or executive (e.g., 1 bit). In certain examples, the flags and the lower 56 bits of the "capability bounds" share encoding with the "capability value".

Figure 3A:
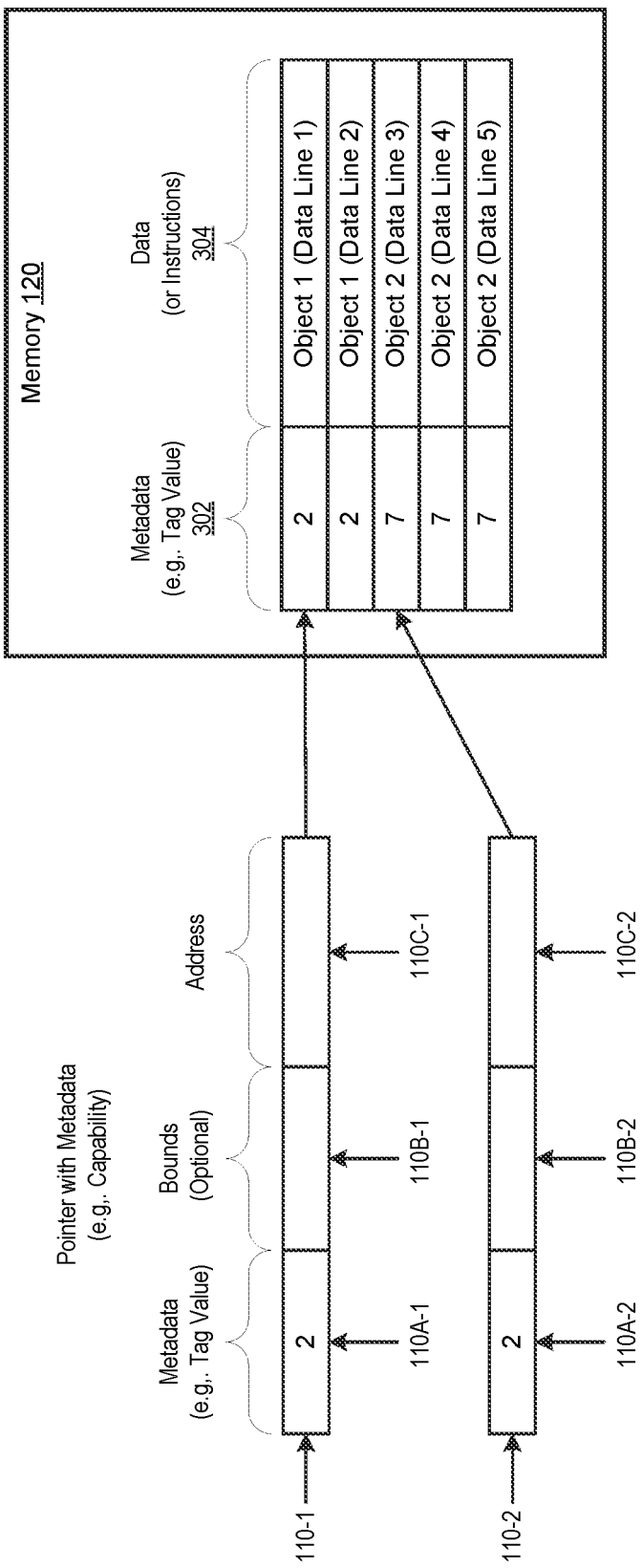
FIG. 3A is a schematic illustration of a pointer format in an implementation of typed store buffers for hardening store forwarding in accordance with some examples.

In certain examples, it is desirable to not have redundant metadata, for example, to use non-redundant metadata storage to provide enhanced security (e.g., via security metadata) and do not waste memory or limit the amount of metadata that can be associated with each object in memory. In FIG. 3A, it is shown that the additional instances of the same metadata values are utilizing storage space that could otherwise be used for data (or instructions) 304 for each object. In certain examples, both the metadata 302 (e.g., at least some metadata but not the validity tag) and data (or instructions) 304 are stored within addressable memory (e.g., within cache lines of the memory) (e.g., within the ordinary data storage portion of the cache line and not in separate "only metadata" storage) in contrast to (i) storing the metadata in a separate "only metadata" data structure (e.g., table) that is or is not part of the addressable memory or (ii) storing the metadata in special metadata storage added to each of the cache lines (e.g., and thus a metadata and its data cumulatively being wider than line width 310 in FIG. 3B).

Figure 3B:
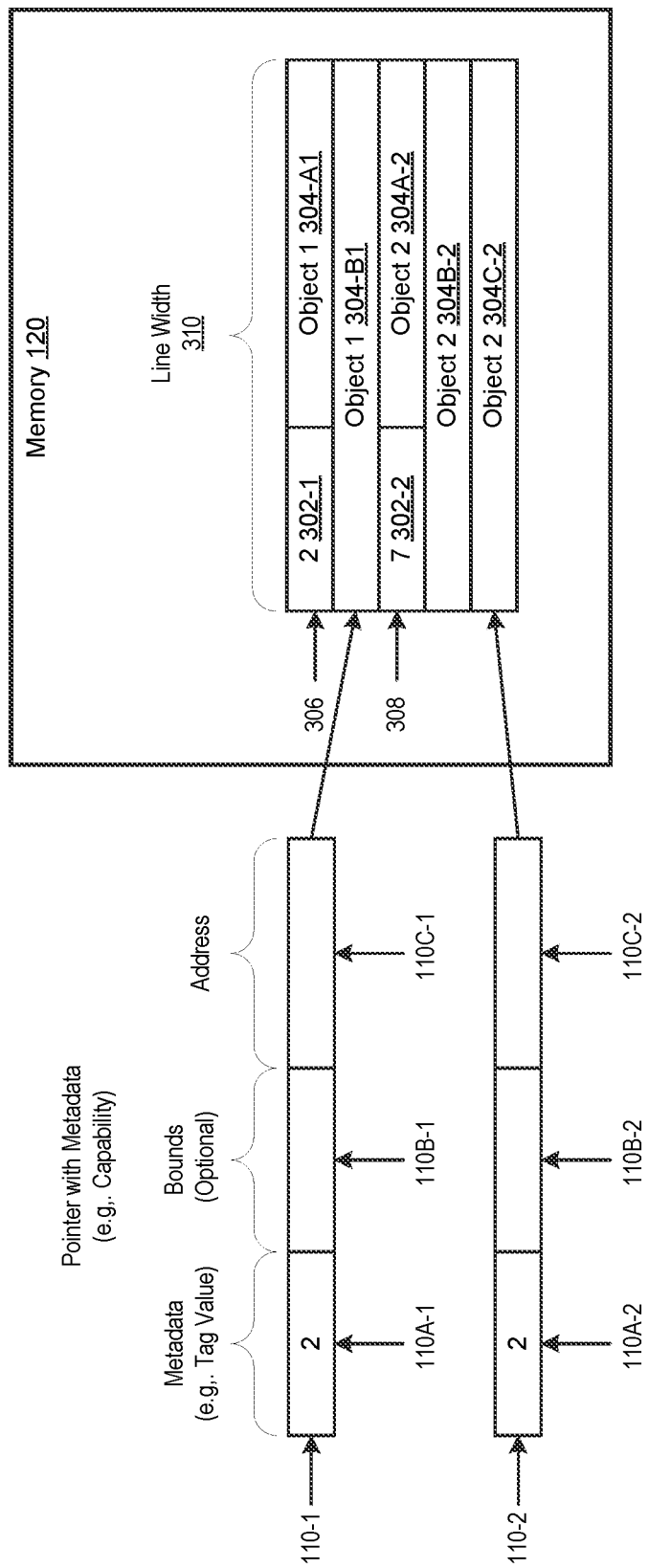
FIG. 3B is a schematic illustration of a pointer format in an implementation of typed store buffers for hardening store forwarding in accordance with some examples.

FIG. 3B is a schematic illustration of a pointer (e.g., capability) format 110 with a metadata field, a bounds field, and an address field pointing to a corresponding object stored in memory 120 with non-redundant metadata 302 storage according to examples of the disclosure. FIG. 3B includes an example of five lines (e.g., although it may be any plurality) of addressable memory 120 that each have a same line (e.g., cache line) width 310, for example, allowing for non-redundant metadata to be stored in the ordinary data portion of the lines (e.g., cache lines), e.g., in a portion that otherwise is usable for ordinary data storage. FIG. 3B depicts a first pointer 110-1 that includes a metadata field 110A-1, a bounds field 110B-1, and an address field 110C-1 pointing to a corresponding first object ("object 1") 304A stored in proper subset 304A-1 of line one and all of line two 304B-1 in memory 120 with a single instance of non-redundant metadata 302-1 for both lines (shown as a value of "2", e.g., as a MCD value example). FIG. 3B depicts a second pointer 110-2 that includes a metadata field 110A-2, a bounds field 110B-2, and an address field 110C-2 pointing to a corresponding second object ("object 2") 304B stored in proper subset 304A-2 of line three, all of line four 304B-2, and all of line five 304C-2 in memory 120 with a single instance of non-redundant metadata 302-2 for all three lines (shown as a value of "7", e.g., as a MCD value example).

In certain examples, the bounds field indicates the lower bound and/or upper bound of an object, for example, bounds field 110B-1 for object 1 indicating (e.g., via address(es) for that line) that line 1 is the lower bound of object 1 and line 2 is the upper bound of object 1, and bounds field 110B-2 for object 2 indicating (e.g., via address(es) for that line) that line 3 is the lower bound of object 2 and line 5 is the upper bound of object 2. For example, that address 306 is the lower bound of object 1 (e.g., and address field 110C-1 points to line 2 304B-1 of object 1 to access that particular line) and address 308 is the lower bound of object 2 (e.g., and address field 110C-2 points to line 5 304C-2 of object 2 to access that particular line). Although bounds are described in this example as being lines, it should be understood that bounds may be identified at other granularities, for example, in terms of one or more bytes of memory.

In FIG. 3B, it is shown that the additional instances of the same metadata values are not present, and thus not utilizing storage space that could otherwise be used for data (or instructions) 304 for each object, e.g., the extra space instead used for data (or instructions) in data line 2 304B-1 for the first object and the extra space for data (or instructions) in data line 4 304B-2 and data line 5 304C-2 for the second object.

It should be understood that a metadata (e.g., capability) management circuit 108 is to have knowledge of the format used, e.g., such that it does not incorrectly assume that a data (or instruction) value stored according to the format in FIG. 3B in the formerly metadata portion of a line according to the format in FIG. 3A is metadata, e.g., for security reasons.

In certain examples, the metadata may be stored within addressable memory, e.g., addressable memory 122 in the Figures.

Figure 4:
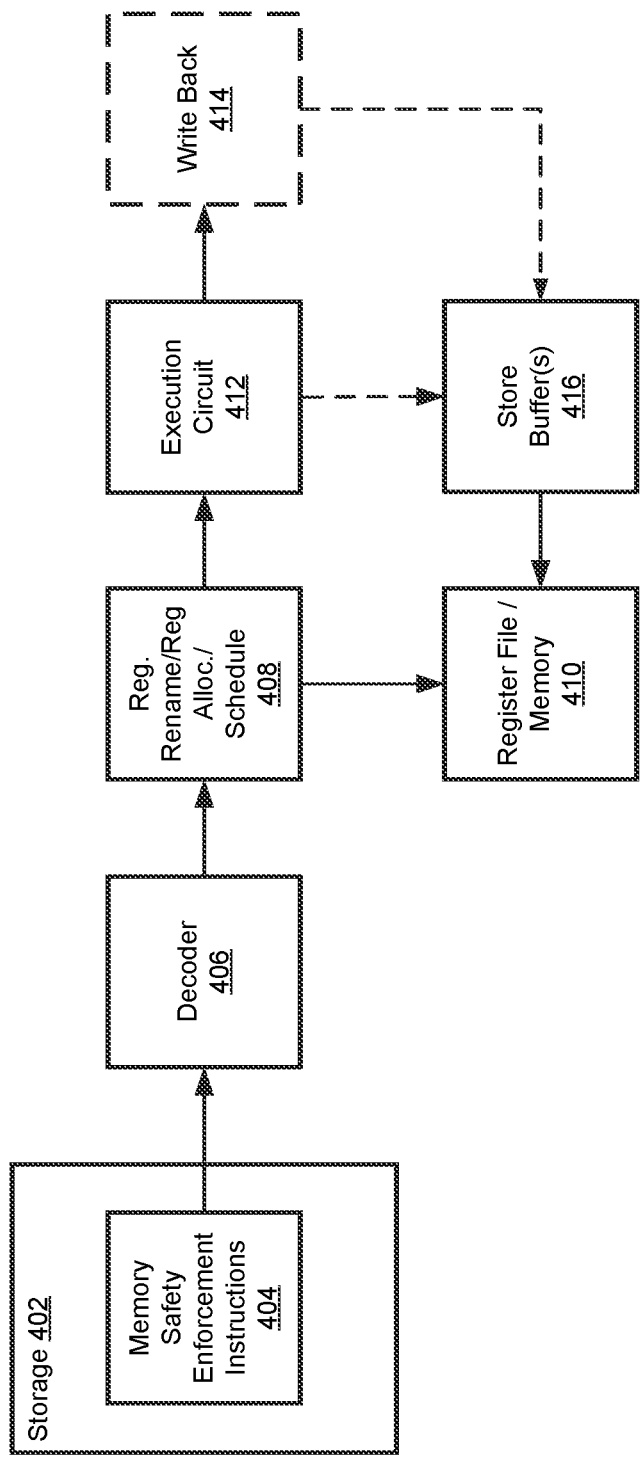
FIG. 4 is a schematic illustration of a hardware processor coupled to storage that may be used to implement typed store buffers for hardening store forwarding in accordance with some examples.

FIG. 4 illustrates a hardware processor 300 coupled to storage 302 that includes one or more memory safety enforcement instructions 304 according to embodiments of the disclosure. In some embodiments, e.g., in response to a request to perform an operation, the instruction (e.g., macro-instruction) is fetched from storage 402 and sent to decoder 406. In the depicted embodiment, the decoder 406 (e.g., decoder circuit) decodes the instruction into a decoded instruction (e.g., one or more micro-instructions or micro-operations). The decoded instruction is then sent for execution, e.g., via scheduler circuit 408 to schedule the decoded instruction for execution.

In certain embodiments, (e.g., where the processor/core supports out-of-order (OoO) execution), the processor includes a register rename/allocator circuit coupled to register file/memory circuit 410 (e.g., unit) to allocate resources and perform register renaming on registers (e.g., registers associated with the instruction). In certain embodiments, (e.g., for out-of-order execution), the processor includes one or more scheduler circuits 408 coupled to the decoder. The scheduler circuit(s) may schedule one or more operations associated with decoded instructions, including one or more operations decoded from a memory safety enforcement instruction, for execution on the execution circuit 412.

In certain embodiments, a write back circuit 414 is included to write back results of an instruction to a destination (e.g., write them to a register(s) and/or memory), for example, so those results are visible within a processor (e.g., visible outside of the execution circuit that produced those results). One or more store buffers 416 may be communicatively coupled to the execution circuit 412 and/or the write back circuit 414.

In certain embodiments, if a check being performed to determine whether an object type identifier in a store instruction matches an expected object type identifier in a load instruction fails, then in response to the failure the processor does not allow the store buffer data to be forwarded to the load instruction. In some examples, if the processor has ruled out the possibility of mis-speculation, e.g., due to a younger store overlapping the store whose data is being considered for forwarding, then the processor may generate a fault due to the type mismatch.

Having described various hardware systems and data structures useful to implement typed store buffers for hardening store forwarding in accordance with some examples, various operations in methods to implement typed store buffers for hardening store forwarding in accordance with some examples will be described with reference to FIG. 4, FIGS. 5A-5B, and FIG. 6.

Figure 5A:
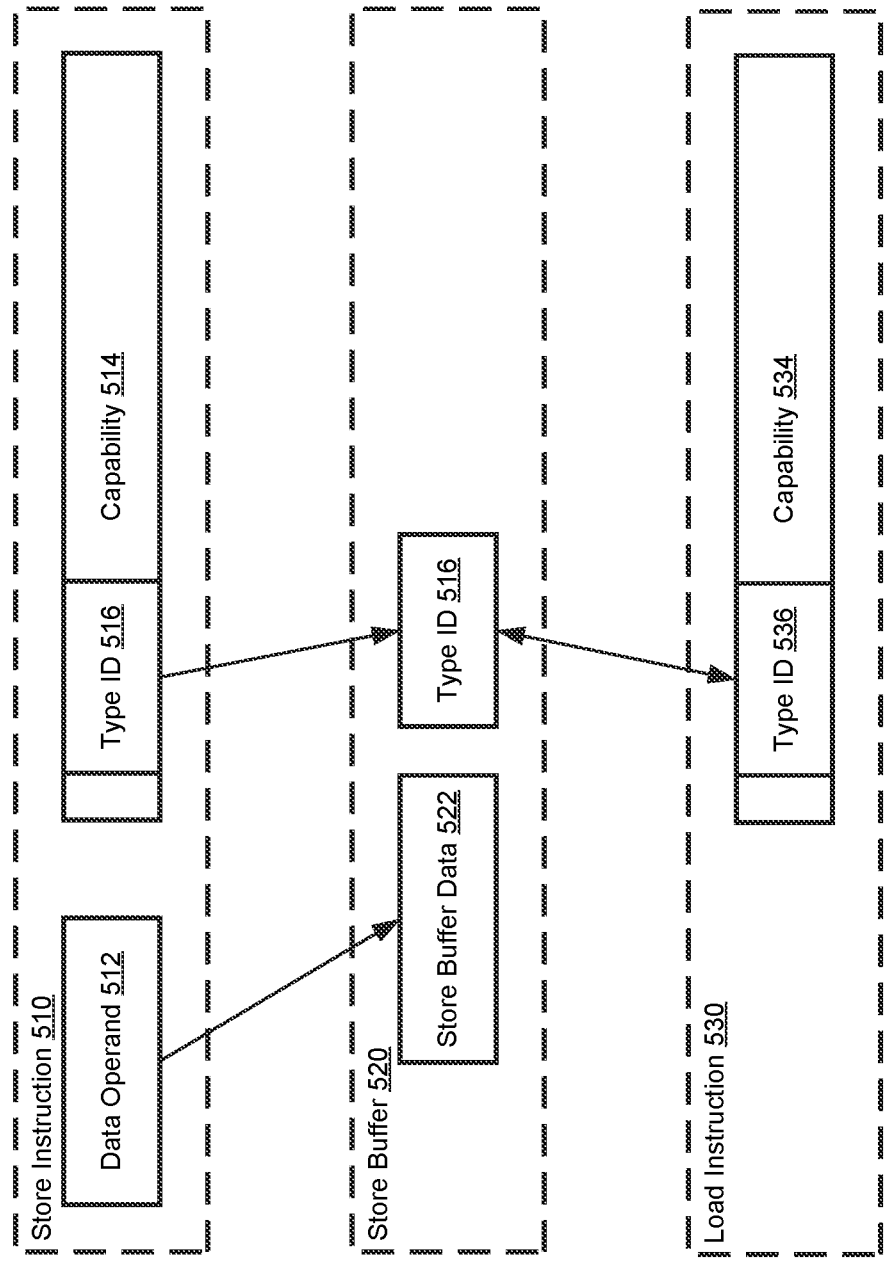
FIG. 5A is a schematic illustration of a data flow in a method to implement typed store buffers for hardening store forwarding in accordance with some examples.

FIG. 5A is a schematic illustration of memory structures in an implementation of typed store buffers for hardening store forwarding in accordance with some examples. Referring to FIG. 5A, in some examples a store instruction 510 may comprise, or make reference to, one or more capabilities 514, e.g., in a suitable register as described above. In some examples the capability may comprise a type identifier (ID) 516 that may comprise a numeric ID for a data type that describes the data operand 512. By way of example, the type ID 516 may comprise a numeric ID that defines the data operand 512 as a character string, an integer, or the like. Similarly, a load instruction 530 may comprise, or make reference to, one or more capabilities 534, which also comprise a type identifier (ID) 536 for a data type that describes the type of the data operand the load instruction 530 expects to receive. In some examples, when the store instruction 510 is called for execution the data operand 512 and the type ID 516 are moved into the store buffer data 522 section of a store buffer 520.

In some instances, the type ID field in a capability register operand may refer to an assigned type for an overall data structure in which only a particular field is being accessed by the pair of load/store instructions in question. For example, the type ID may reference a data record (e.g., an employee information record) that may include multiple different fields (e.g., first name, last name, employee number, etc.), some of which may be of different types. In this instance, the potential remains for speculative type confusion to occur between differently typed fields within identically typed overall structure(s).

Referring to FIG. 5, to address this and other issues, the store buffer 520 can be extended to include an offset 528 in addition to the type ID 516. The offset 528 may indicate where in the overall data structure the access occurred. For store-to-load forwarding to be permitted, both the type IDs and offsets would need to match between the store instruction 510 and the corresponding load instruction 530. For example, the offset for each load and store may be computed using the rules defined for the instruction set, e.g., by adding a scaled index and/or a displacement to the base address. The encoding of the instruction may specify the operands for computing the offset, e.g., an index register, a scaling factor, and/or a displacement value.

In further examples it may be possible to derive type information implicitly from instruction encodings and/or to explicitly specify field types in instruction encodings, and to store the type ID 516 and the implicitly derived type ID 526 in addition to other metadata in the store buffer 520 to be checked for a match between loads and stores.

Figure 5B:
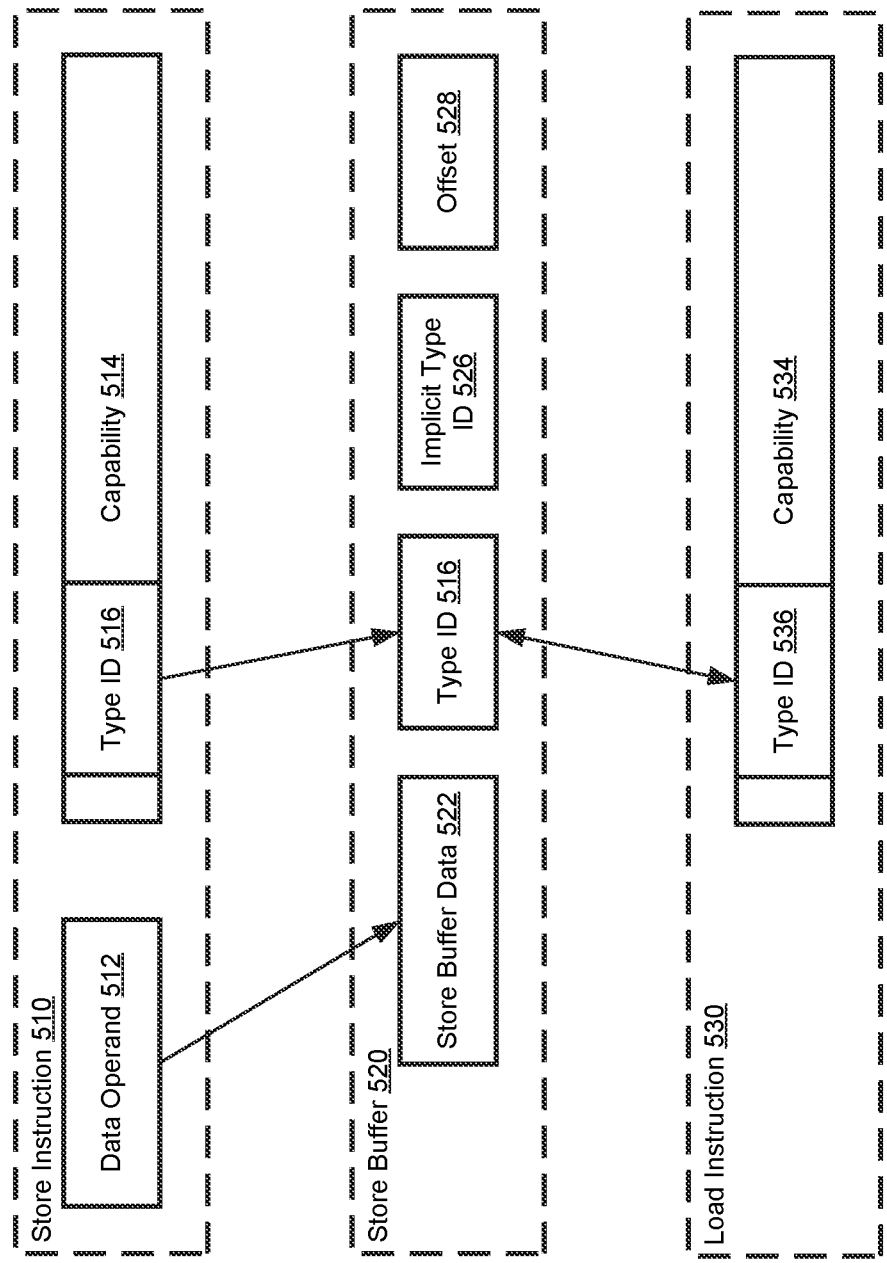
FIG. 5B is a schematic illustration of data flows which may be used in a method to implement typed store buffers for hardening store forwarding in accordance with some examples.
Figure 6:
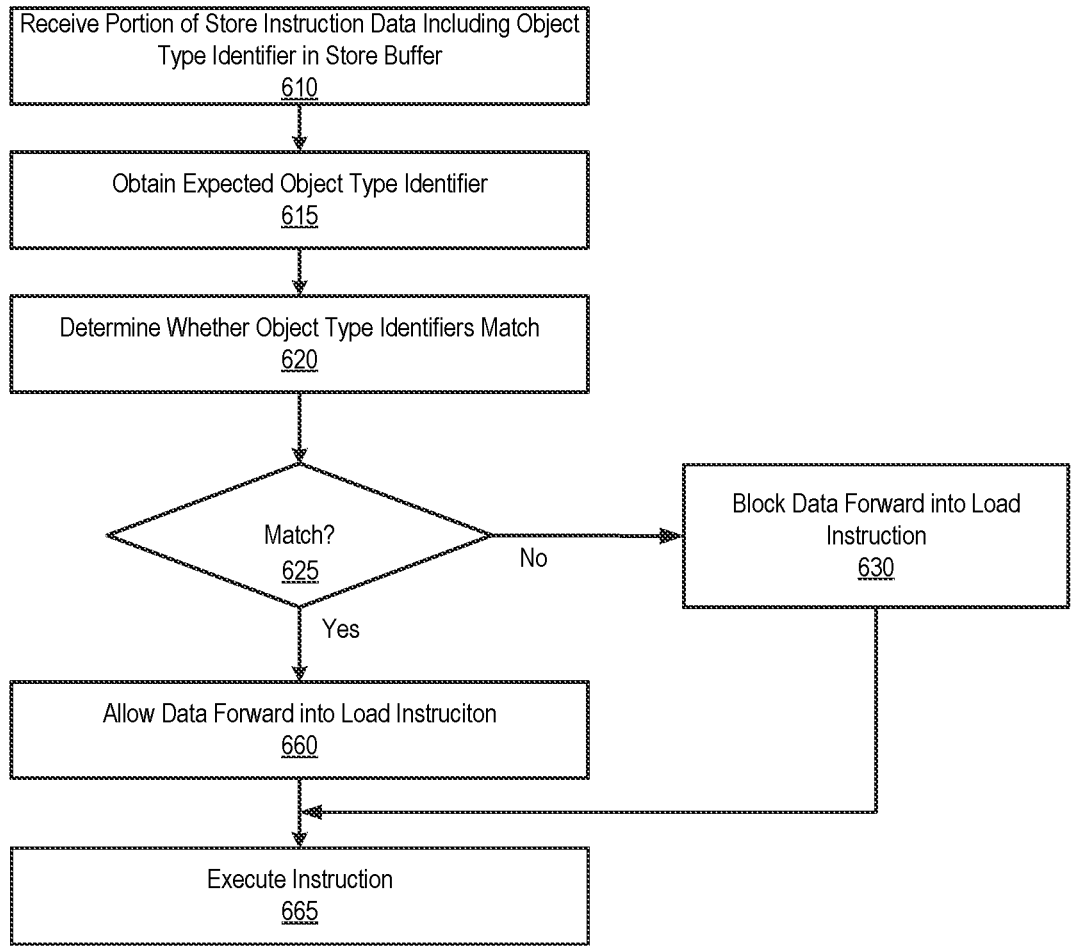
FIG. 6 is a flowchart illustrating operations in a method to implement typed store buffers for hardening store forwarding in accordance with some examples.

In certain embodiments, if a check being performed to determine whether an object type identifier in a store instruction matches an expected object type identifier in a load instruction fails, then the failure processor does not allow the store buffer data to be forwarded to the load instruction, thereby preventing execution of the load instruction. In some examples, if the processor has ruled out the possibility of mis-speculation, e.g., due to a younger store overlapping the store whose data is being considered for forwarding, then the processor may generate a fault due to the type mismatch FIG. 6 is a flowchart illustrating operations in a method 600 to implement typed store buffers for hardening store forwarding in accordance with some examples. Referring to FIG. 6, at operation 610 a portion of the store instruction data is received, e.g., in the store buffer data 622 of store buffer 620. In some examples the portion of the store instruction 510 comprises the data operand 512 and the object type ID 516, which may be stored as a component of a capability 514 as illustrated in FIG. 5A. In further examples the portion of the store instruction 510 may comprise a data operand 512 an implicit type ID 526 and/or an offset 528, as illustrated in FIG. 5B.

At operation 615 the expected object type identifier is obtained from the corresponding load instruction that is paired to the store instruction. In some examples the expected load type ID may be obtained from the type ID 636 in the capability register operand 534 of the load instruction 530, as illustrated in FIG. 5A and FIG. 5B.

At operation 620 it is determined whether the object type identifiers match. In the embodiment depicted in FIG. 5A, the object type ID 516 may be compared to the object type ID 536 to determine whether there is a match. Alternatively, or in addition, the object type ID 516 may be compared to the implicit type ID 526 to determine whether there is a match.

If, at operation 625, there is not a match between the object type identifiers then operation 630 is implemented and the data in the store buffer 520 is blocked from being forwarded to the load instruction 530 and operation 645 is implemented. The OS may react to a fault by terminating the program. By contrast, if at operation 625 there is a match between the object type identifiers then operation 640 is implemented and the data in the store buffer 520 is allowed to be forwarded to the load instruction 530. Operation 645 is then implemented, and the load instruction 530 is executed.

Figure 7:
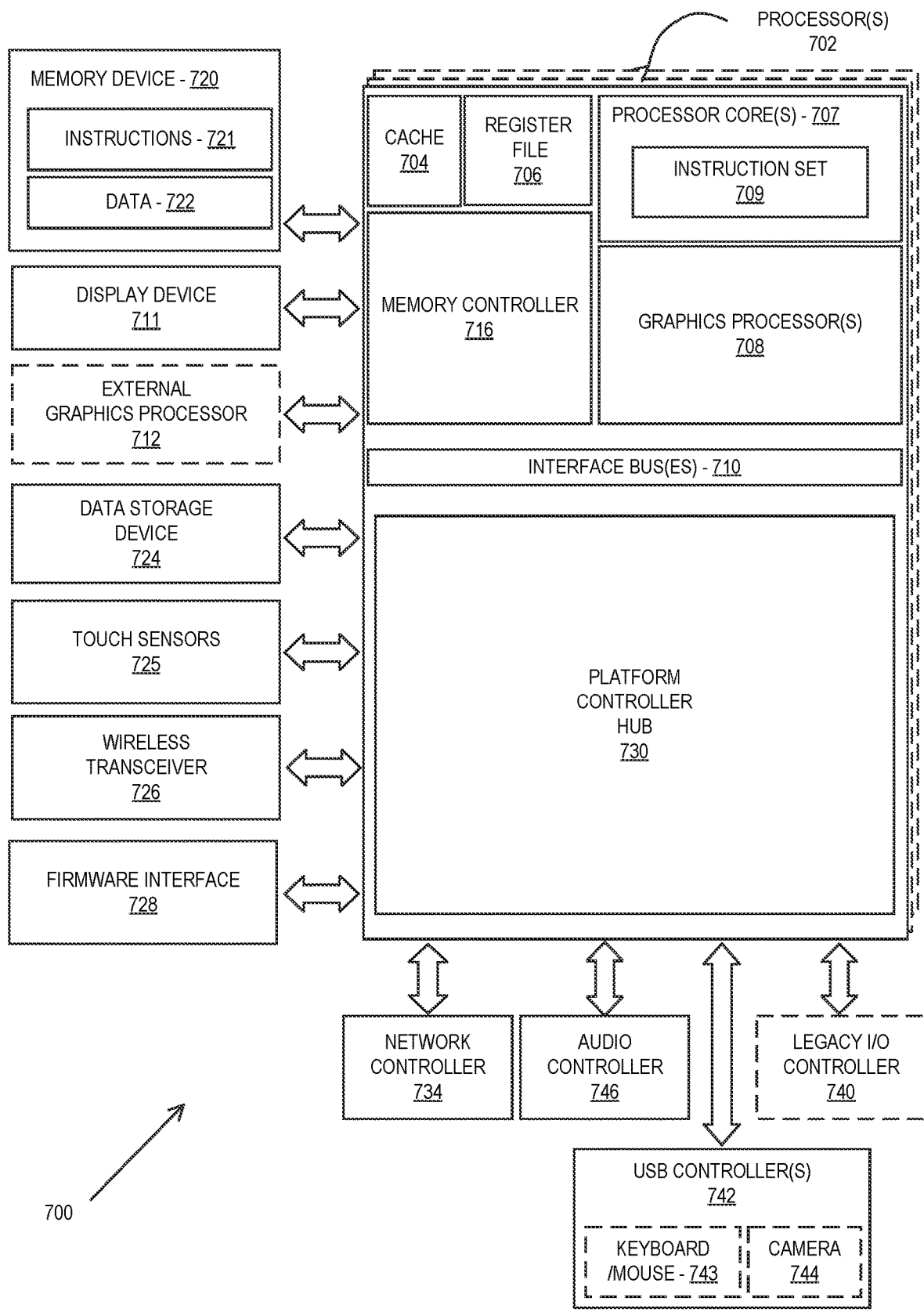
FIG. 7 is a schematic illustration of a computing architecture which may be adapted to implement typed store buffers for hardening store forwarding in accordance with some examples.

FIG. 7 is a schematic illustration of a computing architecture which may be adapted to implement typed store buffers for hardening store forwarding in accordance with some examples. In various embodiments, the computing architecture 700 may comprise or be implemented as part of an electronic device. In some embodiments, the computing architecture 700 may be representative, for example of a computer system that implements one or more components of the operating environments described above. In some embodiments, computing architecture 700 may be representative of one or more portions or components of a digital signature signing system that implement one or more techniques described herein. The embodiments are not limited in this context.

As used in this application, the terms "system" and "component" and "module" are intended to refer to a computer-related entity, either hardware, a combination of hardware and software, software, or software in execution, examples of which are provided by the exemplary computing architecture 700. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

The computing architecture 700 includes various common computing elements, such as one or more processors, multi-core processors, co-processors, memory units, chipsets, controllers, peripherals, interfaces, oscillators, timing devices, video cards, audio cards, multimedia input/output (I/O) components, power supplies, and so forth. The embodiments, however, are not limited to implementation by the computing architecture 700.

As shown in FIG. 7, the computing architecture 700 includes one or more processors 702 and one or more graphics processors 708, and may be a single processor desktop system, a multiprocessor workstation system, or a server system having a large number of processors 702 or processor cores 707. In on embodiment, the system 700 is a processing platform incorporated within a system-on-a-chip (SoC or SOC) integrated circuit for use in mobile, handheld, or embedded devices.

An embodiment of system 700 can include, or be incorporated within a server-based gaming platform, a game console, including a game and media console, a mobile gaming console, a handheld game console, or an online game console. In some embodiments system 700 is a mobile phone, smart phone, tablet computing device or mobile Internet device. Data processing system 700 can also include, couple with, or be integrated within a wearable device, such as a smart watch wearable device, smart eyewear device, augmented reality device, or virtual reality device. In some embodiments, data processing system 700 is a television or set top box device having one or more processors 702 and a graphical interface generated by one or more graphics processors 708.

In some embodiments, the one or more processors 702 each include one or more processor cores 707 to process instructions which, when executed, perform operations for system and user software. In some embodiments, each of the one or more processor cores 707 is configured to process a specific instruction set 709. In some embodiments, instruction set 709 may facilitate Complex Instruction Set Computing (CISC), Reduced Instruction Set Computing (RISC), or computing via a Very Long Instruction Word (VLIW). Multiple processor cores 707 may each process a different instruction set 709, which may include instructions to facilitate the emulation of other instruction sets. Processor core 707 may also include other processing devices, such a Digital Signal Processor (DSP).

In some embodiments, the processor 702 includes cache memory 704. Depending on the architecture, the processor 702 can have a single internal cache or multiple levels of internal cache. In some embodiments, the cache memory is shared among various components of the processor 702. In some embodiments, the processor 702 also uses an external cache (e.g., a Level-3 (L3) cache or Last Level Cache (LLC)) (not shown), which may be shared among processor cores 707 using known cache coherency techniques. A register file 706 is additionally included in processor 702 which may include different types of registers for storing different types of data (e.g., integer registers, floating point registers, status registers, and an instruction pointer register). Some registers may be general-purpose registers, while other registers may be specific to the design of the processor 702.

In some embodiments, one or more processor(s) 702 are coupled with one or more interface bus(es) 710 to transmit communication signals such as address, data, or control signals between processor 702 and other components in the system. The interface bus 710, in one embodiment, can be a processor bus, such as a version of the Direct Media Interface (DMI) bus. However, processor busses are not limited to the DMI bus, and may include one or more Peripheral Component Interconnect buses (e.g., PCI, PCI Express), memory busses, or other types of interface busses. In one embodiment the processor(s) 702 include an integrated memory controller 716 and a platform controller hub 730. The memory controller 716 facilitates communication between a memory device and other components of the system 700, while the platform controller hub (PCH) 730 provides connections to I/O devices via a local I/O bus.

Memory device 720 can be a dynamic random-access memory (DRAM) device, a static random-access memory (SRAM) device, flash memory device, phase-change memory device, or some other memory device having suitable performance to serve as process memory. In one embodiment the memory device 720 can operate as system memory for the system 700, to store data 722 and instructions 721 for use when the one or more processors 702 executes an application or process. Memory controller hub 716 also couples with an optional external graphics processor 712, which may communicate with the one or more graphics processors 708 in processors 702 to perform graphics and media operations. In some embodiments a display device 711 can connect to the processor(s) 702. The display device 711 can be one or more of an internal display device, as in a mobile electronic device or a laptop device or an external display device attached via a display interface (e.g., DisplayPort, etc.). In one embodiment the display device 711 can be a head mounted display (HMD) such as a stereoscopic display device for use in virtual reality (VR) applications or augmented reality (AR) applications.

In some embodiments the platform controller hub 730 enables peripherals to connect to memory device 720 and processor 702 via a high-speed I/O bus. The I/O peripherals include, but are not limited to, an audio controller 746, a network controller 734, a firmware interface 728, a wireless transceiver 726, touch sensors 725, a data storage device 724 (e.g., hard disk drive, flash memory, etc.). The data storage device 724 can connect via a storage interface (e.g., SATA) or via a peripheral bus, such as a Peripheral Component Interconnect bus (e.g., PCI, PCI Express). The touch sensors 725 can include touch screen sensors, pressure sensors, or fingerprint sensors. The wireless transceiver 726 can be a Wi-Fi transceiver, a Bluetooth transceiver, or a mobile network transceiver such as a 3G, 4G, or Long Term Evolution (LTE) transceiver. The firmware interface 728 enables communication with system firmware, and can be, for example, a unified extensible firmware interface (UEFI). The network controller 734 can enable a network connection to a wired network. In some embodiments, a high-performance network controller (not shown) couples with the interface bus 710. The audio controller 746, in one embodiment, is a multi-channel highdefinition audio controller. In one embodiment the system 700 includes an optional legacy I/O controller 740 for coupling legacy (e.g., Personal System 2 (PS/2)) devices to the system. The platform controller hub 730 can also connect to one or more Universal Serial Bus (USB) controllers 742 connect input devices, such as keyboard and mouse 743 combinations, a camera 744, or other USB input devices.

The following pertains to further examples.

Example 1 is an apparatus comprising a store buffer to receive at least a portion of a store instruction, the at least a portion of the store instruction comprising a data operand and a first object capability register operand which comprises a first object type identifier for a first object; and processing circuitry to obtain, from a corresponding load instruction, a second object capability register operand which comprises a second object type identifier; and determine whether the first object type identifier matches the second object type identifier.

In Example 2, the subject matter of Example 1 can optionally include processing circuitry to load block a load of the at least a portion of the store instruction into the corresponding load instruction in response to a determination that the first object type identifier does not match the second object type identifier.

In Example 3, the subject matter of any one of Examples 1-2 can optionally include processing circuitry to load of the at least a portion of the corresponding store instruction into the load instruction in response to a determination that the first object type identifier matches the second object type identifier.

In Example 4, the subject matter of any one of Examples 1-3 can optionally include processing circuitry to generate an error in response to a determination that the first object type identifier does not match the second object type identifier.

In Example 5, the subject matter of any one of Examples 1-4 can optionally include processing circuitry to obtain the first object capability register operand from a base address register.

In Example 6, the subject matter of any one of Examples 1-5 can optionally include an arrangement wherein the store buffer comprises an offset field that represents an offset of the data access within the first object.

In Example 7, the subject matter of any one of Examples 1-6 can optionally include processing circuitry to derive a type identifier from an instruction encoding.

Example 8 is a method, comprising receiving, in a store buffer, at least a portion of a store instruction, the at least a portion of the store instruction comprising a data operand and a first object capability register operand which comprises a first object type identifier for a first object; obtaining, from a corresponding load instruction, a second object capability register operand which comprises a second object type identifier; and determining whether the first object type identifier matches the second object type identifier.

In Example 9, the subject matter of Example 8 can optionally include blocking a load of the at least a portion of the store instruction into the corresponding load instruction in response to a determination that the first object type identifier does not match the second object type identifier.

In Example 10, the subject matter of any one of Examples 8-9 can optionally include loading the at least a portion of the corresponding store instruction into the load instruction in response to a determination that the first object type identifier matches the second object type identifier.

In Example 11, the subject matter of any one of Examples 8-10 can optionally include generating an error in response to a determination that the first object type identifier does not match the second object type identifier.

In Example 12, the subject matter of any one of Examples 8-11 can optionally include obtaining the first object capability register operand from a base address register.

In Example 13, the subject matter of any one of Examples 8-12 can optionally include an arrangement wherein the store buffer comprises an offset field that represents an offset of the data access within the first object.

In Example 14, the subject matter of any one of Examples 8-13 can optionally include deriving a type identifier from an instruction encoding.

Example 15 is a non-transitory computer readable medium comprising instructions which, when executed by a processor, configure the processor to receive at least a portion of a store instruction, the at least a portion of the store instruction comprising a data operand and a first object capability register operand which comprises a first object type identifier for a first object; and processing circuitry to obtain, from a corresponding load instruction, a second object capability register operand which comprises a second object type identifier; and determine whether the first object type identifier matches the second object type identifier.

In Example 16, the subject matter of Example 15 can optionally include the subject matter of claim 15, comprising instructions to block a load of the at least a portion of the store instruction into the corresponding load instruction in response to a determination that the first object type identifier does not match the second object type identifier.

In Example 17, the subject matter of any one of Examples 15-16 can optionally include instructions to a load of the at least a portion of the corresponding store instruction into the load instruction in response to a determination that the first object type identifier matches the second object type identifier.

In Example 18, the subject matter of any one of Examples 15-17 can optionally include instructions to generate an error in response to a determination that the first object type identifier matches does not match the second object type identifier.

In Example 19, the subject matter of any one of Examples 15-18 can optionally include instructions to obtain the first object capability register operand from a base address register.

In Example 20, the subject matter of any one of Examples 15-19 can optionally include an arrangement wherein the store buffer comprises an offset field that represents an offset of the data access within the first object.

In Example 21, the subject matter of any one of Examples 15-20 can optionally include instructions to derive a type identifier from an instruction encoding.

The above Detailed Description includes references to the accompanying drawings, which form a part of the Detailed Description. The drawings show, by way of illustration, specific embodiments that may be practiced. These embodiments are also referred to herein as "examples." Such examples may include elements in addition to those shown or described. However, also contemplated are examples that include the elements shown or described. Moreover, also contemplated are examples using any combination or permutation of those elements shown or described (or one or more aspects thereof), either with respect to a particular example (or one or more aspects thereof), or with respect to other examples (or one or more aspects thereof) shown or described herein.

Publications, patents, and patent documents referred to in this document are incorporated by reference herein in their entirety, as though individually incorporated by reference. In the event of inconsistent usages between this document and those documents so incorporated by reference, the usage in the incorporated reference(s) are supplementary to that of this document; for irreconcilable inconsistencies, the usage in this document controls.

In this document, the terms "a" or "an" are used, as is common in patent documents, to include one or more than one, independent of any other instances or usages of "at least one" or "one or more." In addition "a set of" includes one or more elements. In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended; that is, a system, device, article, or process that includes elements in addition to those listed after such a term in a claim are still deemed to fall within the scope of that claim. Moreover, in the following claims, the terms "first," "second," "third," etc. are used merely as labels, and are not intended to suggest a numerical order for their objects.

The terms "logic instructions" as referred to herein relates to expressions which may be understood by one or more machines for performing one or more logical operations. For example, logic instructions may comprise instructions which are interpretable by a processor compiler for executing one or more operations on one or more data objects. However, this is merely an example of machine-readable instructions and examples are not limited in this respect.

The terms "computer readable medium" as referred to herein relates to media capable of maintaining expressions which are perceivable by one or more machines. For example, a computer readable medium may comprise one or more storage devices for storing computer readable instructions or data. Such storage devices may comprise storage media such as, for example, optical, magnetic or semiconductor storage media. However, this is merely an example of a computer readable medium and examples are not limited in this respect.

The term "logic" as referred to herein relates to structure for performing one or more logical operations. For example, logic may comprise circuitry which provides one or more output signals based upon one or more input signals. Such circuitry may comprise a finite state machine which receives a digital input and provides a digital output, or circuitry which provides one or more analog output signals in response to one or more analog input signals. Such circuitry may be provided in an application specific integrated circuit (ASIC) or field programmable gate array (FPGA). Also, logic may comprise machine-readable instructions stored in a memory in combination with processing circuitry to execute such machine-readable instructions. However, these are merely examples of structures which may provide logic and examples are not limited in this respect.

Some of the methods described herein may be embodied as logic instructions on a computer-readable medium. When executed on a processor, the logic instructions cause a processor to be programmed as a special-purpose machine that implements the described methods. The processor, when configured by the logic instructions to execute the methods described herein, constitutes structure for performing the described methods. Alternatively, the methods described herein may be reduced to logic on, e.g., a field programmable gate array (FPGA), an application specific integrated circuit (ASIC) or the like.

In the description and claims, the terms coupled and connected, along with their derivatives, may be used. In particular examples, connected may be used to indicate that two or more elements are in direct physical or electrical contact with each other. Coupled may mean that two or more elements are in direct physical or electrical contact. However, coupled may also mean that two or more elements may not be in direct contact with each other, but may still cooperate or interact with each other.

Reference in the specification to "one example" or "some examples" means that a particular feature, structure, or characteristic described in connection with the example is included in at least an implementation. The appearances of the phrase "in one example" in various places in the specification may or may not be all referring to the same example.

The above description is intended to be illustrative, and not restrictive. For example, the above-described examples (or one or more aspects thereof) may be used in combination with others. Other embodiments may be used, such as by one of ordinary skill in the art upon reviewing the above description. The Abstract is to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. However, the claims may not set forth every feature disclosed herein as embodiments may feature a subset of said features. Further, embodiments may include fewer features than those disclosed in a particular example. Thus, the following claims are hereby incorporated into the Detailed Description, with each claim standing on its own as a separate embodiment. The scope of the embodiments disclosed herein is to be determined with reference to the appended claims, along with the full scope of equivalents to which such claims are entitled.

Although examples have been described in language specific to structural features and/or methodological acts, it is to be understood that claimed subject matter may not be limited to the specific features or acts described. Rather, the specific features and acts are disclosed as sample forms of implementing the claimed subject matter.

What is claimed is:

1. An apparatus to store typed store buffers, the apparatus comprising:
   processing circuitry to facilitate a store buffer to receive a portion of a store instruction, wherein the portion of the store instruction comprises a data operand and a first object capability register operand which comprises a first object type identifier for a first object, wherein the processing circuitry is to:
   obtain, from a load instruction, a second object capability register operand which comprises a second object type identifier;
   determine whether the first object type identifier matches the second object type identifier; and
   block the portion of the store instruction from being loaded into the load instruction in response to a determination that the first object type identifier does not match the second object type identifier.

2. The apparatus of claim 1, the processing circuitry to:
   load the portion of the store instruction into the load instruction in response to a determination that the first object type identifier matches the second object type identifier.

3. The apparatus of claim 2, the processing circuitry to:
   generate an error in response to a determination that the first object type identifier does not match the second object type identifier.

4. The apparatus of claim 1, the processing circuitry to:
   obtain the first object capability register operand from a base address register.

5. The apparatus of claim 1, wherein the store buffer comprises an offset field that represents an offset of the data access within the first object.

6. The apparatus of claim 1, the processing circuitry to:
   derive a type identifier from an instruction encoding.

7. A method for storing typed store buffers, the method comprising:
   receiving, in a store buffer as facilitated by a processor of a computing device, a portion of a store instruction, wherein the portion of the store instruction comprises a data operand and a first object capability register operand which comprises a first object type identifier for a first object;
   obtaining, from a load instruction, a second object capability register operand which comprises a second object type identifier;
   determining whether the first object type identifier matches the second object type identifier;
   blocking the portion of the store instruction from being loaded into the load instruction in response to a determination that the first object type identifier does not match the second object type identifier; and
   loading the portion of the store instruction into the load instruction in response to a determination that the first object type identifier matches the second object type identifier.

8. The method of claim 7, further comprising:
   generating an error in response to a determination that the first object type identifier does not match the second object type identifier.

9. The method of claim 7, further comprising:
   obtaining the first object capability register operand from a base address register.

10. The method of claim 7, wherein the store buffer comprises an offset field that represents an offset of the data access within the first object.

11. The method of claim 7, further comprising:
    deriving a type identifier from an instruction encoding.

12. A non-transitory computer-readable medium having stored thereon instructions which, when executed, cause a computing device to perform operations comprising:
    receiving, in a store buffer, a portion of a store instruction, wherein the portion of the store instruction comprises a data operand and a first object capability register operand which comprises a first object type identifier for a first object;
    obtaining, from a load instruction, a second object capability register operand which comprises a second object type identifier;
    determining whether the first object type identifier matches the second object type identifier; and
    blocking the portion of the store instruction from being loaded into the load instruction in response to a determination that the first object type identifier does not match the second object type identifier.

13. The computer-readable medium of claim 12, wherein the operations further comprise:
    loading the portion of the store instruction into the load instruction in response to a determination that the first object type identifier matches the second object type identifier.

14. The computer-readable medium of claim 13, wherein the operations further comprise:
   generating an error in response to a determination that the first object type identifier does not match the second object type identifier.

15. The computer readable medium of claim 12, wherein the operations further comprise:
   obtaining the first object capability register operand from a base address register.

16. The computer readable medium of claim 15, wherein the store buffer comprises an offset field that represents an offset of the data access within the first object.

17. The computer readable medium of claim 16, wherein the operations further comprise:
   derive a type identifier from an instruction encoding.

* * * * *